Sept. 3, 1963

D. McMILLAN ET AL 3,102,787

PREPARATION OF HYDROGEN FLUORIDE

Filed July 13, 1960

INVENTORS
DONALD McMILLAN
CHARLES C. QUARLES

BY John E. Griffiths
ATTORNEY

Sept. 3, 1963    D. McMILLAN ET AL    3,102,787
PREPARATION OF HYDROGEN FLUORIDE
Filed July 13, 1960    2 Sheets-Sheet 2

INVENTORS
DONALD McMILLAN
CHARLES C. QUARLES

BY *John E. Griffiths*
ATTORNEY

United States Patent Office 3,102,787
Patented Sept. 3, 1963

3,102,787
PREPARATION OF HYDROGEN FLUORIDE
Donald McMillan, Ogden Dunes, and Charles C. Quarles, Crown Point, Ind., assignors to E. I. du Pont de Nemours and Company, Wilmington, Del., a corporation of Delaware
Filed July 13, 1960, Ser. No. 42,657
17 Claims. (Cl. 23—153)

This invention relates to the production of hydrogen fluoride and is more particularly directed to processes in which a metal fluoride is treated with a mixture of sulfuric acid, sulfur trioxide, and water vapor at a temperature low enough to allow liquid sulfuric acid to condense on and to react with the metal fluoride but high enough so that the metal fluoride particules do not become sticky.

Hydrofluoric acid has heretofore been prepared by making a paste or slurry of calcium fluoride in sulfuric acid and conducting the reaction with a suitable source of heat while mixing or stirring the paste or slurry. This mixture has been very difficult to handle for it adheres to the walls of a kiln or other reaction vessel and forms cakes or putty-like masses on the equipment used to carry out the reaction. This makes heat exchange grossly inefficient, which seriously limits capacity, and furthermore seriously interferes with the efficient and economical maintenance of a desired temperature. Also, the poor mixing causes poor contacting of the acid with the calcium fluoride.

The present invention overcomes these deficiencies of the prior art.

The processes of the present invention are conducted so that the calcium fluoride (or other metal fluoride) particles are reacted in suitable equipment for handling such particles without their becoming at any time sticky or pasty. Thus the particles can readily be reacted, the temperatures of the reaction can be closely controlled, and the resulting calcium sulfate produced can be readily withdrawn from the reactor. There will be no substantial amount of sticking of calcium fluoride to the walls or surfaces of the equipment used. In addition, the use of heat transfer surfaces and attendant problems has been eliminated.

The present process applies to the preparation of hydrogen fluoride from any alkali metal or alkaline earth metal fluoride. Because of its low cost, the mineral fluorospar, which is essentially calcium fluoride, is preferred.

According to the present invention, liquid sulfuric acid is used to keep the temperature low as required and vaporous sulfur trioxide and steam are used to supply heat to the reactor. The heat liberated is largely the heat of reaction of the $SO_3$ and steam. In this manner, it has been found possible to carefully balance the condensation rate of sulfuric acid upon the calcium fluoride particles. There should be enough sulfuric acid condensed upon the particles to effect a rapid reaction but there should not at any time be enough to cause the particles to become sticky and hence to form the objectionable paste or sticky mass.

The processes of the invention will now be described with respect to the accompanying drawing in which.

Figure 1:
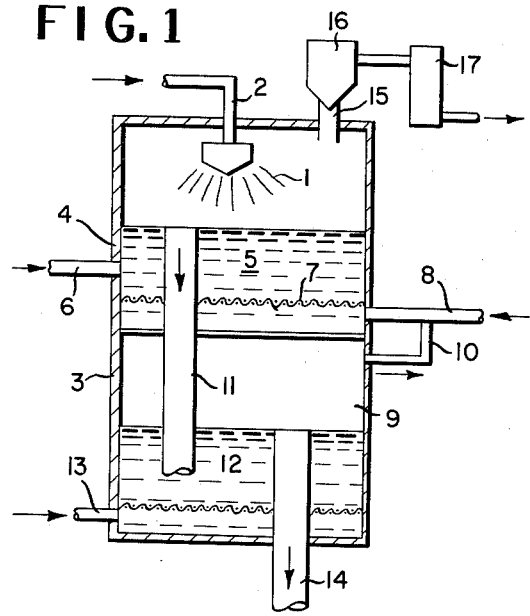
FIGURE 1 illustrates schematically a 2-step fluidized bed reaction according to the present invention.

Referring now to FIGURE 1 and starting at the top of the equipment liquid sulfuric acid 1 is sprayed through inlet 2 onto the top of or into the fluidized bed in the top portion 4 of the reactor 3. The fluidized bed 5 comprises calcium fluoride particles and reaction products thereof.

Through feed pipe 6, a feed of calcium fluoride particles is maintained into the top portion 4. Below the retaining screen 7, there is an inlet 8 for sulfur trioxide vapor. Through the same inlet 8, steam together with hydrogen fluoride and sulfuric acid vapor from the lower reaction chamber 9 is introduced through pipeline 10. A mixture of steam, hydrogen fluoride, sulfur trioxide and sulfuric acid vapor passes upwardly through the screen 7 and maintains the particles in a fluid condition for reaction.

As will be understood, in the reaction the calcium fluoride reacts with the sulfuric acid, which condenses on its surface, to produce hydrogen fluoride and calcium sulfate. Since the reaction occurs over a period of time, partially reacted calcium fluoride particles overflow through a downcomer 11 and enter into a lower fluidized bed 12.

In the lower bed 12, the partially reacted calcium fluoride-calcium sulfate particles are further reacted and stripped of free sulfuric acid. The particles that are brought down into the lower reaction zone carry condensed sulfuric acid on the surfaces and further reaction is effected by the use of super-heated steam introduced through steam inlet 13, which also maintains the particles in a fluidized condition. Reacted calcium sulfate particles overflow through a pipe 14, and hydrogen fluoride gas, together with steam and sulfuric acid vapor, passes from the top of the lower reaction chamber 9 to the upper chamber 4 through pipeline 10.

The product of the processes is obtained at the top of the upper reaction chamber 4 through an outlet 15, which is provided with conventional dust collector 16 and conventional scrubber equipment 17 in which sulfuric acid and water vapors carried over are removed by scrubbing with concentrated sulfuric acid. The hydrogen fluoride product is condensed by cooling and is collected as the product of the process. Dust removed from the gas stream may be discarded or recycled to the reactor.

Another embodiment of the process of this invention will now be described with reference to FIGURE 2. The process of this embodiment is substantially the same as that described above, except in the apparatus utilized there are a plurality of zones positioned in series in which the reaction is conducted. Because of the larger number of reaction stages, somewhat smaller equipment can be used for the same production, better solid-gas contacting is achieved, and optimum conditions for each zone can be maintained. The equipment used is quite similar to that of FIGURE 1, as will be seen from inspection of FIGURE 2, with each zone having a retaining screen 23, but with the difference that there is no separating wall between zones because the gas streams are allowed to flow upwardly countercurrent to the solid stream.

Figure 2:
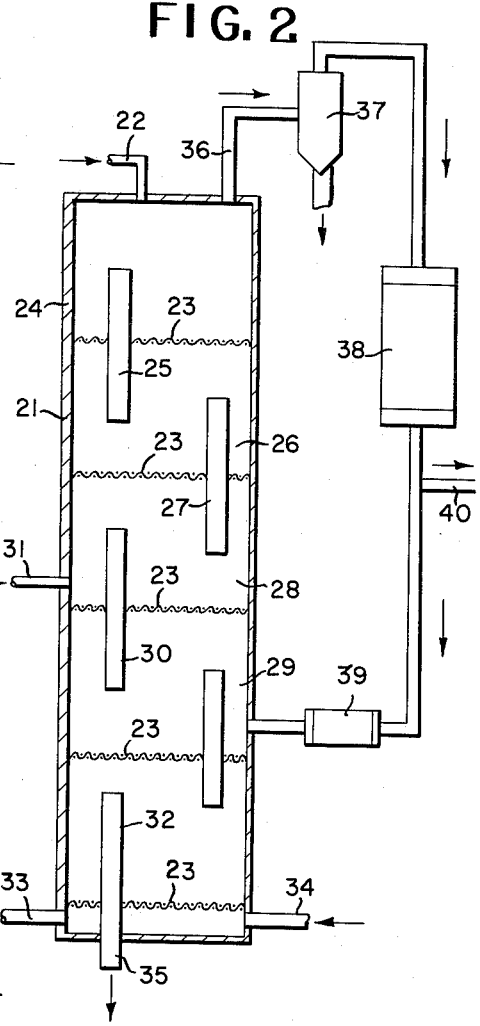
FIGURE 2 illustrates schematically an alternative embodiment of a fluidized bed reaction of the invention.

Referring now to FIGURE 2 of the drawing, into reactor 21 is fed through inlet 22 cold calcium fluoride particles near the top of the fluidized bed reactor. The cold calcium fluoride particles are introduced into zone 24 above retaining screen 23 where they are preheated and maintained in a fluidized condition while this occurs. Overflow from this zone passes downwardly through the downcomer 25.

The material passing down into the reaction zone 26 is there maintained in a fluidized state and in turn passes through a second downcomer 27 into reaction zone 28. The calcium fluoride is progressively reacted to form calcium sulfate with the release of vaporous hydrogen fluoride.

The components again pass downwardly through downcomer 30 into reaction zone 29, into which liquid sulfuric acid, or water, or both together, is introduced through feed pipe 31 to control the temperature of the reaction. Through feed pipes 33 and 34 respectively, sulfur trioxide vapor and steam are also introduced into the last reaction zone. Calcium sulfate product flows downwardly through the last downcomer 32 and is taken from the reactor through pipe 35. Yields on both calcium fluoride and sulfuric acid can be markedly increased by the use of a number of stages similar to zones 28 and 29. The number of such stages may be from 2 to 50, with 5 to 20 preferred.

Products of the reaction leave the reactor through outlet 36 and pass through a suitable dust collector 37. Calcium fluoride and calcium sulfate dust are returned to the reaction zone 24 or removed from the system. Recycle of coarse calcium fluoride dust and removal of fine dust largely calcium sulfate, is advantageous. Enough fines should be retained in the bed for good fluidization. The vapors from dust collector 37 are cooled in a condenser 38. At this stage, high-boiling components such as sulfuric acid and fluosulfonic acid are removed from the system. Reusable liquids in the system are recycled and heated to the proper temperature in heat exchanger 39. The recycle can be returned either as a liquid suitably dispersed into the bed, as by spraying or as vapors. This recycle can be distributed to several bed zones.

Instead of using a surface condenser, as shown, a wet type gas scrubber or other equivalent apparatus could of course be used to remove undesired components from the product gas stream. Wet scrubbing is particularly advantageous if the dust separator is for any reason less efficient than desired.

The hydrogen fluoride produced is removed through outlet 40 and is then condensed by cooling and collected.

In place of either of these fluidized bed reactors illustrated in the drawing and described above, it will be readily understood that there can be used modified equipment, such as a reactor having only a single fluidized bed. Such a reactor would need to be somewhat larger than the equipment illustrated in FIGURE 1, but the entire reaction could be satisfactorily carried out in the single vessel. Under such conditions, the steam being introduced at the bottom would be at such a temperature and the other reaction conditions would be so conducted under such conditions that the overflow from the fluidized bed is largely calcium sulfate or such that the calcium sulfate is largely entrained out in the product gas stream.

In an alternative type of apparatus suitable for carrying out the processes of this invention, a moving bed operation can be used in place of the fluidized bed described above. The moving bed system is a well-recognized method for conducting a gas-solid reaction. The apparatus is conventionally referred to as a "moving bed" type of reactor.

Figure 3:
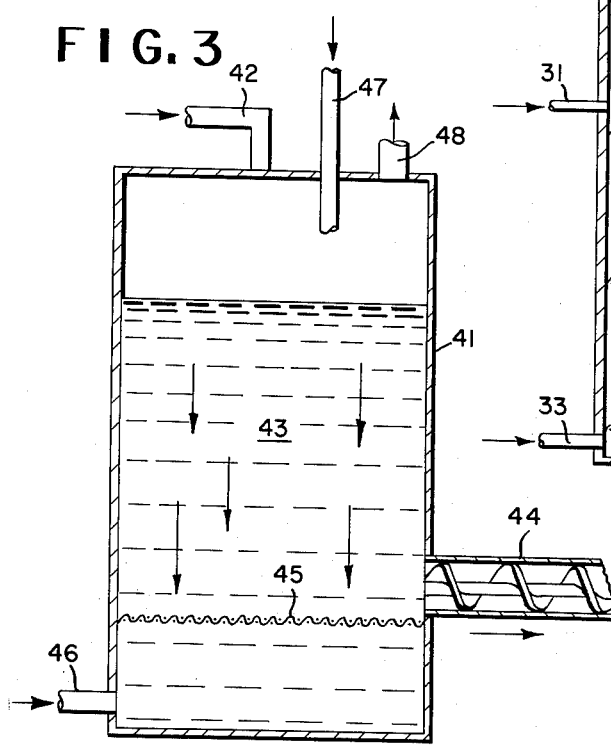
FIGURE 3 illustrates schematically suitable fluidized moving bed apparatus useful according to the processes of the present invention.

A suitable moving bed apparatus is schematically illustrated in FIGURE 3 of the drawings. Referring to FIGURE 3, into the moving bed reactor 41 through feedpipe 42 is fed cold calcium fluoride which moves steadily downwardly as indicated by the arrows in bed 43 under controlled temperature conditions while the reaction is taking place. The temperature is controlled by adding liquid sulfuric acid to the bed through feed pipe 47 as in the fluidized bed process. The calcium sulfate produced by this method is removed by any suitable means, such as screw 44 near the bottom of the bed. Retaining screen 45 is provided in the usual manner.

The calcium fluoride particles utilized in this process cannot be and need not be as small as for the fluidized bed reactor. Ordinarily the calcium fluoride should be pelleted as comparatively porous pellets of about one-eighth inch diameter, as will be readily understood in accordance with customary practices.

In the moving bed system, as in the fluidized bed system, vaporous sulfur trioxide and super-heated steam are introduced near the bottom of the reactor through inlet pipe 46. The hydrogen fluoride containing gases are removed through outlet 48, purified and the product collected as in the fluidized bed processes.

It will also be readily apparent that instead of the moving bed or fluidized bed systems one could instead use a screw conveyor, a rotating kiln, a pug mill, or any other suitable material handling equipment for gas to solid contact. Two types of such equipment found useful are illustrated in FIGURES 4 and 5.

Figure 4:
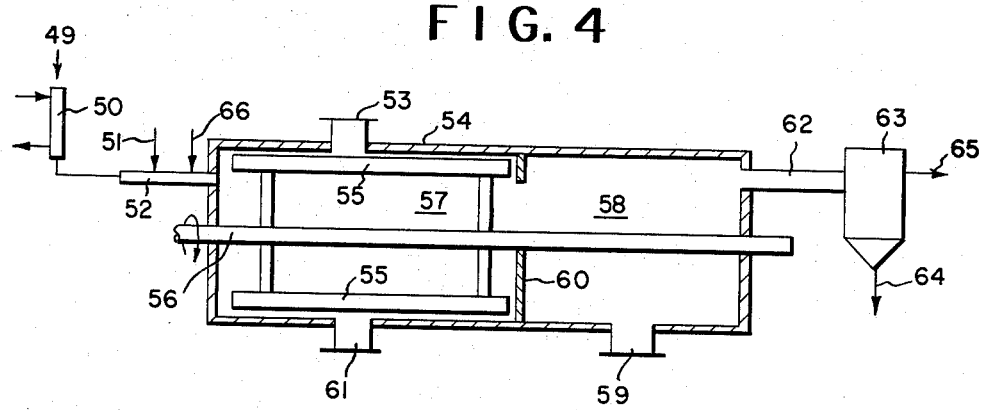
FIGURE 4 illustrates schematically a suitable mechanically agitated bed type reactor suitable for conducting the processes of this invention on a batchwise basis.

Referring to FIGURE 4, steam 49 is passed through a heat exchanger 50 and mixed with sulfur trioxide vapor 51 in a T 52. In the reactor 54 a batch charge of metal fluoride in compartment 57 it agitated by the filters or blades 55 attached to rotating shaft 56. Baffle 60 separates the agitated bed in zone 57 from the dust settling chamber 58. Metal fluoride entrained out of zone 57 in the product HF sulfuric acid vapor stream largely settles in zone 58. The gas stream leaving via duct 62 consists of HF, sulfuric acid vapor, some suspended calcium sulfate, minor amounts of metal fluoride, and other reaction products. In dust collector 63 the dust in gas stream is collected and discarded as waste residue. The product HF in the exit gas stream is collected and purified by any convenient procedures.

In practice a batch of fluorspar is charged through nozzle 53 and preheated with hot air entering through line 66. Steam-$SO_3$ vapor addition is then initiated and the quality, i.e. wetness, of the steam controlled with heat exchanger 50 to keep sulfuric acid condensing in the reactor at the desired rate. The reaction zone temperature is gradually raised as the calcium fluoride is depleted to keep the free sulfuric acid in the bed within the range where caking and balling of the bed are minimized or do not occur. At the end of a batch, residue from zone 57 is discharged through nozzle 61 and discarded. Dust accumulated in zone 58 contains unreacted fluoride which is emptied through nozzle 59 and recycled to zone 57 in a subsequent batch.

Figure 5:
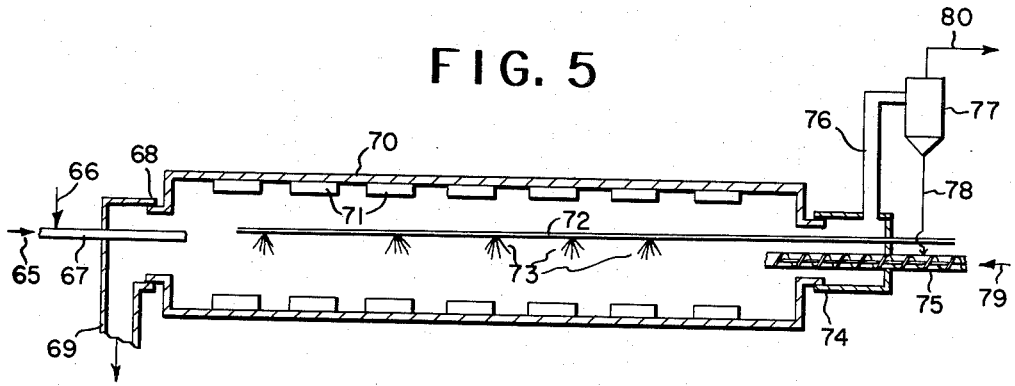
FIGURE 5 illustrates schematically a continuous rotary reactor found useful for the processes of this invention.

Referring to FIGURE 5, steam enters via line 65 and is mixed with sulfur trioxide vapor entering via line 66 and the resulting mixture enters the reactor through line 67. The reactor consists of a rotating shell 70 equipped with lifter blades 71 to pick up bed material and shower the solids through the vapor space. The rotating reactor is equipped with suitable seals 68 and 74 to prevent leakage of air into, or process gases out of, the reactor.

Reacted residue leaves by overflowing through stationary nozzle 69. Calcium fluoride 79 is fed continuously in through screw 75. Condensation of sulfuric acid on the bed is controlled according to the principles of this invention by the liquid acid sprays 73 fed through lines 72. In the residue discharge end of the reactor the reaction is driven to completion and the excess sulfuric acid not reacted can largely be boiled out of the residue by the high temperature $SO_3$-steam mixture. The product off-gas containing the HF exits via line 76, the dust therein is largely removed by dust collector 77, and then the HF goes to a standard collection and purification system through line 80. Dust collected in dust collector 77 is returned to the reactor through line 78 and screws 75 or may be discarded.

In the preceding examples the solids flow has largely been counter-current to the gas flow. Co-current flow, particularly, in equipment similar to FIGURE 5, has been found not only feasible but offers some advantages. The number of sulfuric acid sprays can be smaller in order to get adequate condensation control. With co-current flow the dust removed from the off-gas can be essentially all calcium sulfate and can be discarded without recycle.

Counter-current flow permits sulfuric acid vaporization from the residue easily and a better sulfuric yield results, i.e. more efficient conversion of $H_2SO_4$ to metal sulfate. In co-current flow sulfuric vaporization can also be achieved by suitable injection of an inert such as air or HF itself, which can be recycled from the output end of the reactor, to raise the sulfuric dew point in the last portions of the discharge end of the reactor. Also, by suitable use of inerts in either co-current or counter-current operation the dew points throughout the reactor can be controlled such that the number of sulfuric acid sprays can be greatly reduced.

The fluidized bed offers some advantages because of the more intimate mixing, better heat and mass transfer, and other advantages inherent in this type of operation. In the fluidized equipment, the particles are "boiling" and are maintained in a state of suspension while moving rather rapidly. The mechanically agitated types of equipment such as FIGURES 4 and 5 can be operated at somewhat higher free sulfuric acid contents than fluidized beds while maintaining the non-caking principles of this invention.

In the processes of the present invention, the calcium fluoride used can be of the type normally employed for the preparation of hydrogen fluoride. Preferably, any commercially available "acid-grade" fluorspar is used because it has a low silica content. Such commercial products usually have particle sizes characterized in the trade as "70% through 200 mesh," "77% through 200 mesh," and the like. Still finer fluorspar can be prepared by grinding to a desired size, and the fluorspar can be pelleted as mentioned above to make larger particles if desired.

The fluorspar particle size should be selected and the equipment designed taking into account considerations normally applicable to fluidized bed operation, if that is the system utilized. This requires a balance of the particle size, its mass, the rates of gas flow, the volumes of gases used, etc. Balancing these factors is well understood in the art and does not require detailed description here.

The sulfuric acid used should be at least 90% $H_2SO_4$ and is preferably 98–100% $H_2SO_4$. If more cooling is wanted in the processes of the invention, there can be used of course a more dilute sulfuric acid. For example, it has been found satisfactory to use sulfuric acid of 78% $H_2SO_4$, 60° Baumé, and even this can be diluted further with water if desired. More simply, water can be injected into the system for cooling purposes. Water injection is, in essence, shown in FIGURE 4 wherein steam is cooled to give a vapor-liquid mixture. Ordinarily, the more concentrated sulfuric acid, such as 98–100%, is preferred in order to reduce the need for sulfur trioxide. In some types of equipment, as will be readily understood, oleums can be used to reduce even further the sulfur trioxide load.

Instead of the above-mentioned temperature control methods all of the sulfuric acid can be added as $SO_3$-steam and the temperature regulated by the vaporization of liquid HF. Cooled gas recycle can also be used.

Sulfur trioxide such as that obtained by distillation of oleum is also introduced into the process. Steam introduced will normally be saturated steam as available on a plant, but super-heated steam can be used if it is conveniently available. The use of super-heated steam can effect an improvement in yield, as in the case of the equipment of FIGURE 1. Super-heated steam at temperatures of say 400–500° C. can be used to strip sulfuric acid from the calcium sulfate in the last stage of the process. Such stripping also makes the residues more suitable for sale.

The total amount of sulfuric acid introduced into the process of the present invention, which acid can be introduced as sulfuric acid, or sulfur trioxide and steam, should be somewhat more than stoichiometrically required. The acid is ordinarily used in from a 0 to 10% excess, and preferably 2 to 5% excess, based on complete conversion of the fluorspar. Larger excesses can be used but is wasteful of acid, and an extremely large excess will tend to cause difficulties because of excessive condensation on the fluorspar. An excess of fluorspar can also be used, of course, with a reduction in yield of calcium fluoride. The use of excess acid, therefore, is preferred to improve the yield of the more expensive crude.

According to the invention, the sulfur trioxide will normally be used in such proportion relative to the steam and the strength of the sulfuric acid so that there will be a water to sulfur trioxide balance of approximately 1 mole of water for each mole of sulfur trioxide. The use of an overall sulfur trioxide oxide to water ratio equivalent to 98–99% sulfuric acid has been found to be particularly advantageous. Stronger ratios can be used but result in greater formation of fluosulfonic acid. Weaker ratios can be used with some corresponding increase in the moisture content of the product gas stream. If aqueous rather than anhydrous hydrofluoric acid is desired, equivalent sulfuric acid strengths of 90% or lower can be used. Of course, if hydrofluoric acid concentrating facilities are provided, weak equivalent sulfuric acid strengths can be used to make anhydrous hydrofluoric acid.

The temperatures maintained within the reaction zones are very important. The temperatures should of course be below the boiling point of sulfuric acid, 335° C. maximum at atmospheric pressure. This is important because, in order to obtain rapid reaction rates, sulfuric acid must condense upon the calcium fluoride particles. The optimum temperature in any particular stage, or segment, of a reactor is that temperature which condenses sulfuric acid as rapidly as it will react without giving enough free sulfuric to cause caking or, in a fluidized bed reactor, loss of fluidization. This temperature is a function of gas flows, bed fluoride content, type of equipment, and gas composition, as will be readily understood.

Preferably, to obtain a fast reaction rate, the temperatures should be as near 300° C. or higher as is practical, all other factors being considered, and can range upward to the point of boiling. High temperatures increase the sulfuric acid carried out in the product gas stream, and also increase the resulting gas scrubbing problem. Temperatures in the product gas exit zone up to 250° C. have been found to be especially satisfactory.

The temperature on the other hand, should for most efficient operation be such that the vapor pressure of fluosulfonic acid (atmospheric boiling point 163° C.) is greater than its partial pressure in the gas stream. If the temperature is below this, hydrogen fluoride will be carried out as fluosulfonic acid in the calcium sulfate residue and lost. Thus, temperatures between 100° and 335° C. at atmospheric pressure are particularly useful.

With respect to temperature, as has been noted generally above, the exact temperature in our particular equipment and under the specific conditions will be adjusted so that there is not enough sulfuric acid condensing out on the calcium fluoride particles so that they become sticky. This can be easily observed by an operator who can adjust the temperatures upwardly or downwardly by using appropriate amounts of sulfur trioxide and steam on the one hand, and of sulfuric acid on the other.

It is further to be noted that the temperatures should be near the top of the range toward the end of the reaction of the calcium fluoride to minimize the amount of sulfuric acid which may be carried out of the system, and the temperatures should be lower near the point where the hydrogen fluoride is taken off to reduce the amount of sulfuric acid vapor carried off with the product and required to be condensed and returned. It will be seen that this type of temperature gradient will result in the equipment as illustrated because the liquid sulfuric acid is added near the top of the column shown and the superheated steam or the steam and SO₃ is added near the bottom, and this is true also in the case of the rotary contactor of FIGURE 5. In the co-current rotary or pug mill type reactors a compromise is necessary on the temperature at the exit end to optimize sulfuric carry out in the residue and gas stream.

It will be readily apparent to one skilled in the art that the pressure at which the process is operated will influence the temperatures at which successful operation can be obtained. For example, the use of superatmospheric pressures will permit sulfuric acid to condense on the particles at higher temperatures than mentioned above. Likewise, vacuum operation will reduce sulfuric condensation and permit operation at lower temperatures. Therefore, by the proper selection of pressure, temperature, and equipment size the process can be conducted according to this invention at almost any temperature above that at which sulfuric acid and calcium fluoride start reacting, i.e. approximately 100° C.

The walls of the reactors used should be kept warm to avoid condensation of sulfuric acid on the walls. This can be done by the use of external heating means, such as steam or electrical heating. In many instances, insulation of the walls will be sufficient. The wall temperature can vary, of course, depending upon the vapor pressure of sulfuric acid in the particular zone involved.

If a fluidized bed is used, the equipment will be chosen with reference to the size of the particles and the amounts of gas to be used, as will be readily understood. In reactions of this type, the velocity of the gas stream obviously will depend somewhat on the amount of gas which can be or must be used in the reaction. An inert gas such as air or hydrogen fluoride can be introduced to increase the stream velocities in the fluidized system if desired. These also reduce the partial pressure of the sulfuric acid, so that somewhat lower temperatures can be used without excessive condensation and sticking of the calcium fluoride. As mentioned above, by proper control of these factors, acid sprays can be reduced or eliminated.

It will be appreciated that the calcium fluoride enters the reaction in the unreacted state, but of course is partially converted to calcium sulfate fairly soon in the reaction, and so for the most part the reaction is occurring with a calcium fluoride-calcium sulfate particle in various stages of conversion to calcium sulfate.

The invention will be further explained but is not intended to be limited by the following specific examples of various embodiments of the invention:

*Example 1*

Using apparatus of the type shown in FIGURE 1, 225 pounds of commercial, acid grade fluorspar, 77% through 200 mesh, is introduced through feed pipe 6. The temperature of the upper bed 5 is maintained at approximately 335° C. and at a pressure slightly above atmospheric. Through feed pipe 2, 600 pounds of 99% sulfuric acid collected in the off-gas scrubber 17 is sprayed into bed 5. Into feed pipe 8, 1700 pounds of sulfur trioxide vapor is introduced at a temperature of about 100° C. Into feed pipe 13, 400 pounds of 10 p.s.i. steam super-heated to 500° F. is fed. From the dust collector 16 approximately 380 pounds of calcium sulfate residue is removed containing less than 1% free sulfuric acid.

The hydrogen fluoride gas containing sulfuric acid vapor and mist, silicon tetrafluoride, and other lesser impurities leaving the dry dust collector 16 is scrubbed in the wet scrubber 17. The scrubbing liquid, consisting of sulfuric acid and other impurities previously removed from the gas, is cooled, and recycled over the scrubber. The liquid is continuously purged from the scrubber to maintain a constant liquor inventory in the scrubber. The purge acid is recycled to the reactor through feed pipe 2 as described above and/or filtered to remove solids and used as a feed to other processes capable of using a somewhat contaminated sulfuric acid. The hydrogen fluoride gas leaving the scrubber 17 is condensed, purified by distillation and excellent quality hydrogen fluoride collected in excellent yield.

*Example 2*

Using apparatus of the type illustrated in FIGURE 2 of the drawing, 217 pounds of a commercial acid-grade fluorspar 70% through 200 mesh is introduced at the top of the reactor. Sulfuric acid (99% concentrated) at room temperature is dispersed into an intermediate zone 28 through feed pipe 31, the amount being 80 pounds over the period of time of operation here considered.

Sulfur trioxide vapor in an amount of 164 pounds is introduced at the bottom of the reactor 21 through feed pipe 33 at a temperature of about 150° C. 37 pounds of saturated steam at 60 pounds per square inch pressure is added through feed pipe 34.

The calcium fluoride introduced through inlet 22 reacts as it moves downwardly from zone to zone, and at no time is there any tendency for the particles to stick together and ball up into a mass. Calcium sulfate which accumulates in the bottom zone is discharged through outlet pipe 35.

The hydrogen fluoride evolved is passed through dust collector 37 and the dust which is essentially pure calcium sulfate is discharged from the collector to residue disposal. The gas is cooled to 50° C. in the condenser 38. The gas from the condenser is passed through line 40 to a conventional mist filter and then to a hydrogen fluoride condenser. The condensate from the condenser 38 and the liquid removed in the mist filter are heated to about 250° C. in the heater 39 and sprayed into the bed of zone 29.

The hydrogen fluoride collected in the hydrogen fluoride condenser is found suitable for many commercial uses without further purification. After distillation, it is equal in quality to commercial anhydrous hydrogen fluoride.

*Example 3*

Using an apparatus of the type shown in FIGURE 3, 240 pounds of fluorspar pellets are introduced through feed pipe 42. These pellets have high porosity, are approximately ⅛ inch in diameter, and are prepared from commercial, acid grade fluorspar, 77% through 200 mesh. Sixty-four pounds of virgin 99% sulfuric acid plus the acid recycle from the off-gas wet scrubber is sprayed into the bed through feed pipe 47. Two hundred and seven pounds of sulfur trioxide at 150° C. and 46 pounds of saturated steam at 10 p.s.i. are mixed and fed through feed pipe 46. The bed 43 is maintained at approximately 250° C. under the above conditions.

The hydrogen fluoride gas containing dust, sulfuric acid vapor and mist, silicon tetrafluoride, and other impurities leave the reactor via exit pipe 48. The gas stream is passed through a dry dust cyclone and the dust separated is recycled to the reactor 41. The gases are passed through a conventional wet scrubber operated as in Example 1, the sulfuric acid and other high boilers collected being continuously returned to the reactor through feed pipe 47 as previously mentioned. The hydrogen fluoride gas is condensed and separated from the wet scrubber exit gas stream. After distillation, the hydrogen fluoride is excellent quality anhydrous hydrofluoric acid.

*Example 4*

Using an apparatus of the type shown in FIGURE 4, 80 pounds of commercial acid grade fluorspar, 77% through 200 mesh, is introduced through nozzle 53. This bed is preheated to approximately 290° C. using hot air at 400° C. introduced through line 66. The air is then shut off. Sulfur trioxide vapor at 35 pounds per hour is introduced through line 51 together with 8 pounds per hour of steam through line 49. The cooling water flow to the heat exchanger 50 is regulated and slowly reduced so that the bed temperature rises to a temperature of approximately 320° C. over the period of the initial four hours of SO₃-steam flow. The bed temperature is maintained at about 320–330° C. for the next three hour period. In the final three hour period the bed temperature is increased from 330 to 370° C. at a uniform rate.

Forty-nine pounds of residue containing less than three percent unreacted fluoride and less than 0.5% free sulfuric acid is discharged through nozzle 61. Thirty-three pounds of dust containing about 12% unreacted fluoride is removed through nozzle 59. Approximately 47 pounds of dust containing less than 1.0% unreacted fluoride is removed through line 64 during the run. The HF, sulfuric acid, and other vapors leaving via line 65 are passed through a condenser and good quality anhydrous HF is recovered by distillation of the condensate.

Example 5

Using an apparatus of the type shown in FIGURE 4, 84 pounds of sodium fluoride, 100% through 100 mesh is introduced through nozzle 53. This bed is preheated to approximately 280° C. using hot air at 400° C. introduced through line 66. The air is then shut off. Sulfur trioxide vapor at 40 pounds per hour is introduced through line 51 together with 9 pounds per hour of steam through line 49. The cooling water flow to the heat exchanger 50 is regulated and slowly reduced so that the bed temperature rises to a temperature of approximately 320° C. over the period of the initial five hours of SO₃-steam flow. The bed temperature is maintained at about 320–330° C. for an additional three hour period.

Sixty pounds of residue containing less than three percent unreacted sodium fluoride and less than one-half percent free sulfuric acid is discharged through nozzle 61. Twelve pounds of dust containing less than 15% unreacted sodium fluoride is removed through nozzle 59. Approximately sixty-seven pounds of dust containing less than one percent unreacted sodium fluoride is removed through line 64 during the run. The HF, sulfuric acid, and other vapors leaving via line 65 are passed through a condenser, and good quality anhydrous HF is recovered by distillation of the condensate.

Example 6

Using an apparatus of the type shown in FIGURE 4, 120 pounds of barium fluoride, 100% through 150 mesh is introduced through nozzle 53. This bed is preheated to approximately 280° C. using hot air at 400° C. introduced through line 66. The air is then shut off. Sulfur trioxide vapor at 27 pounds per hour is introduced through line 51 together with 6 pounds per hour of steam through line 49. The cooling water flow to the heat exchanger 50 is regulated and slowly reduced so that the bed temperature rises to a temperature of approximately 325° C. over a period of the initial six hours of SO₃-steam flow. The bed temperature is maintained at about 325–335° C. for an additional eight hour period.

One hundred pounds of residue containing less than three percent unreacted barium fluoride and less than one-half percent free sulfuric acid is discharged through nozzle 61. Nine pounds of dust containing less than 10% unreacted barium fluoride is removed through nozzle 59. Approximately fifty pounds of dust containing less than one percent unreacted barium fluoride is removed through line 64 during the run. The HF, sulfuric acid, and other vapors leaving via line 65 are passed through a condenser, and good quality anhydrous HF is recovered by distillation of the condensate.

Example 7

Using an apparatus of the type shown in FIGURE 5, commercial acid grade fluorspar, 70% through 200 mesh, is introduced through feed screw 79 at a rate of 100 pounds per hour. Sulfur trioxide vapor at 5 p.s.i.g. and 100° C. is fed through line 66 at a rate of 63 pounds/hr. Saturated steam at 5 p.s.i.g. is fed through line 65 at a rate of 14 pounds/hr. and mixed with the above SO₃ in line 67. Through spray nozzles 73 sulfuric acid, 99% strength, is added at a rate of 51 pounds/hr. The rate of acid addition through each of 10 spray nozzles distributed the length of the reactor is controlled to maintain the free sulfuric acid in the bed under 10% throughout the reactor. Temperatures of the bed in the reactor gradually increases from about 180° C. near the fluorspar addition end to about 330° C. at the residue discharge end.

Calcium sulfate containing about 2% unreacted calcium fluoride and approximately 1% free sulfuric acid is discharged through nozzle 69. Hydrogen fluoride containing silicon tetrafluoride, carbon dioxide, sulfur dioxide, sulfuric acid vapor and mist, and dust exits via line 76. Practically all of the calcium fluoride dust and much calcium sulfate dust are removed in the dry dust collector 77 and recycled. The gas stream leaving via line 80 is wet scrubbed with sulfuric acid and the HF product condensed and purified by conventional means.

Carrying out this procedure in co-current operation of course will require a reversal of the temperature gradient of the reactor bed.

Example 8

Using an apparatus of the type shown in FIGURE 2 of the drawing, 100 pounds of sodium fluoride minus 100 mesh is introduced at the top of the reactor. Sulfuric acid (99% strength) at 100° C. is dispersed into intermediate zones such as 28 through feed pipes similar to 31. These feed pipes being equipped with acid dispersers. The amount of sulfuric acid being 58.5 pounds over the period of operation here considered.

Sulfur trioxide vapor in the amount of 68.5 pounds is introduced at the bottom of the reactor 21 through feed pipe 33 at a temperature of about 100° C. Through feed pipe 34 saturated steam at 10 p.s.i.g. is added in the amount of 15 pounds.

The sodium fluoride introduced through inlet 22 reacts as it moves downwardly from zone to zone, and at no times does the material cake or ball up into a mass. Sodium sulfate which accumulates in the bottom zone is discharged through outlet pipe 35.

The hydrogen fluoride evolved is passed through dust collector 37 and the dust, which is largely sodium sulfate is discharged from the collector for disposal. The gas is cooled to 50° C. in the condenser 38. The gas from the condenser is passed through line 40 to a conventional mist filter and then to a hydrogen fluoride condenser. The condensate from condenser 38 and the liquid removed in the mist filter are heated to 300° C. in heater 39 and dispersed into bed zones similar to 29.

The hydrogen fluoride collected in the hydrogen fluoride condenser is distilled to obtain commercial grade product.

This application is a continuation-in-part of our co-pending application Serial No. 834,802, filed August 19, 1959, and now abandoned.

The invention claimed is:

1. In a process for producing hydrogen fluoride, the step comprising contacting a bed of metal fluoride, said metal fluoride being selected from the group consisting of alkali metal fluorides and alkaline earth metal fluorides, with a moving stream of sulfuric acid vapor, sulfur trioxide vapor and water vapor, while maintaining the temperature within the range from 100° C. to the boiling point of sulfuric acid at the pressure used, and continuously maintaining on the surface of said metal fluoride a liquid phase of condensed sulfuric acid.

2. The process as set forth in claim 1 wherein said metal fluoride is calcium fluoride.

3. The process as set forth in claim 1 wherein said metal fluoride is sodium fluoride.

4. The process as set forth in claim 2 wherein the amount of sulfuric acid plus sulfur trioxide plus water vapor is about stoichiometrically equivalent to the amount of said calcium fluoride.

5. The process as set forth in claim 2 wherein said range is from 100° C. to 300° C.

6. In a process for producing hydrogen fluoride, the step comprising suspending calcium fluoride in a moving stream of sulfuric acid, sulfur trioxide and water vapor while maintaining a temperature within the range from 100° to 335° C. by cooling with liquid sulfuric acid and heating by adding steam and sulfur trioxide, the exact temperature being high enough to prevent the calcium fluoride particles from becoming sticky.

7. The process as set forth in claim 6 wherein said temperature range is from 150° to 335° C.

8. The process as set forth in claim 6 wherein said process forms calcium sulfate as a by-product, and said calcium sulfate is heated to vaporize residual sulfuric acid.

9. In a process for producing hydrogen fluoride the step comprising contacting a solid reactant from the group consisting of alkali-metal fluorides and alkaline-earth-metal fluorides with a gas containing sulfuric acid vapor, sulfuric trioxide vapor, and water vapor while maintaining the solids temperature within the range from 100° C. to the boiling point of sulfuric acid at the pressure used, said temperature being low enough whereby acid condenses in the liquid phase on the surface of the solids and high enough whereby the amount of condensed sulfuric acid on the said solids is insufficient to cause caking.

10. The process as set forth in claim 9 wherein said solid temperature range is from 100° C. to 335° C. at atmospheric pressure.

11. In a process for producing hydrogen fluoride, the step comprising contacting, in a reaction zone, a solid reactant from the group consisting of alkali metal fluorides and alkaline earth metal fluorides with a gas containing sulfuric acid vapor, sulfur trioxide vapor, and water vapor while maintaining the solids temperature within the range from 100° C. to the boiling point of sulfuric acid at the pressure used, said temperature being low enough whereby acid condenses in the liquid phase on the surface of the solids and high enough whereby the amount of said condensed sulfuric acid on the surface of said solids is insufficient to cause caking, and said temperature of said solids being maintained within said range by controlling the relative feed rates of said sulfuric acid vapor, said sulfur trioxide vapor, and said water vapor.

12. In a process for producing hydrogen fluoride, the step comprising contacting, in a reaction zone, a solid reactant from the group consisting of alkali metal fluorides and alkaline earth metal fluorides with a gas containing sulfuric acid vapor, sulfur trioxide vapor, and water vapor while maintaining the solids temperature within the range from 100° C. to the boiling point of sulfuric acid at the pressure used, said temperature being low enough whereby acid condenses in the liquid phase on the surface of the solids and high enough whereby the amount of said condensed sulfuric acid on the surface of said solids is insufficient to cause caking, and said temperature of said solids being maintained within said range by adding liquid HF into said reacton zone.

13. In a process for producing hydrogen fluoride, the step comprising contacting, in a reaction zone, a solid reactant from the group consisting of alkali metal fluorides and alkaline earth metal fluorides with a gas containing sulfuric acid vapor, sulfur trioxide vapor, and water vapor while maintaining the solids temperature within the range from 100° C. to the boiling point of sulfuric acid at the pressure used, said temperature being low enough whereby acid condenses in the liquid phase on the surface of the solids and high enough whereby the amount of said condensed sulfuric acid on the surface of said solids is insufficient to cause caking, and said temperature of said solids being maintained within said range by adding hydrogen fluoride to said gas containing sulfuric acid vapor, sulfur trioxide vapor and water vapor prior to the introduction of said gas into said reaction zone.

14. In a process for producing hydrogen fluoride, the step comprising contacting, in a reaction zone, a solid reactant from the group consisting of alkali metal fluorides and alkaline earth metal fluorides with a gas containing sulfuric acid vapor, sulfur trioxide vapor, and water vapor while maintaining the solids temperature within the range from 100° C. to the boiling point of sulfuric acid at the pressure used, said temperature being low enough whereby acid condenses in the liquid phase on the surface of the solids and high enough whereby the amount of said condensed sulfuric acid on the surface of said solids is insufficient to cause caking, and said temperature of said solids being maintained within said range by controlling the relative feed rates of said sulfuric acid vapor, said sulfur trioxide vapor and said water vapor, said process forming a sulfate as a by-product, and heating said sulfate to vaporize residual sulfuric acid.

15. The process of claim 14 wherein said sulfate is calcium sulfate and said calcium sulfate is heated by an $SO_3$ vapor-steam mixture above the dew point of sulfuric acid.

16. The process of claim 14 wherein said sulfate is heated by superheated steam.

17. The process of claim 11 wherein said temperature is additionally controlled by feeding liquid sulfuric acid into said reaction zone.

References Cited in the file of this patent
UNITED STATES PATENTS

| | | |
|---|---|---|
| 1,316,569 | Fickes | Sept. 23, 1919 |
| 1,665,588 | Harshaw et al. | Apr. 10, 1928 |

OTHER REFERENCES

"Fluidization," December 1947, Chem. Eng., pages 112–114.

"Fluidized Solids," May 1953, Chem. Eng., pages 219, 227–231.

Othmer's book on "Fluidization," 1956 ed., page 4, Reinhold Publishing Corp., N.Y.